United States Patent
Smith, Jr.

[15] 3,701,446
[45] Oct. 31, 1972

[54] HORIZONTALLY TURNABLE MATERIAL HANDLING FORKS

[72] Inventor: Raymond Leonard Smith, Jr., Southbury, Conn.

[73] Assignee: C & M Manufacturing Company, Inc., Bethesda, Md.

[22] Filed: Dec. 2, 1970

[21] Appl. No.: 94,334

[52] U.S. Cl. .................................................214/730
[51] Int. Cl. .............................................B66f 9/14
[58] Field of Search......................214/138, 730, 731

[56] References Cited

UNITED STATES PATENTS

| | | | |
|---|---|---|---|
| 3,106,305 | 10/1963 | Gehring | 214/730 |
| 3,460,699 | 8/1969 | Ohntrup | 214/730 |
| 2,667,983 | 2/1954 | Billings | 214/16.1 DC |
| 2,910,204 | 10/1959 | Wight | 214/730 |

FOREIGN PATENTS OR APPLICATIONS 1,338,707   8/1963   France......................214/730

Primary Examiner—Gerald M. Forlenza
Assistant Examiner—Lawrence J. Oresky
Attorney—Littlepage, Quaintance, Wray & Aisenberg

[57] ABSTRACT

Forks are mounted on a vertical pin which extends upright from a carrier elongated in the direction of travel of a lift truck. The carrier moves between parallel rails mounted on a platform of a carriage which is vertically movable on a mast. A turning device connected to the forks and to the carrier turns the forks to one of three positions, left, right or straight ahead. Another device moves the carrier to the left or to the right on the platform.

7 Claims, 4 Drawing Figures

PATENTED OCT 31 1972 3,701,446

INVENTOR
RAYMOND L. SMITH, JR.

BY Littlepage Quaintance Wray & Aisenberg
ATTORNEYS

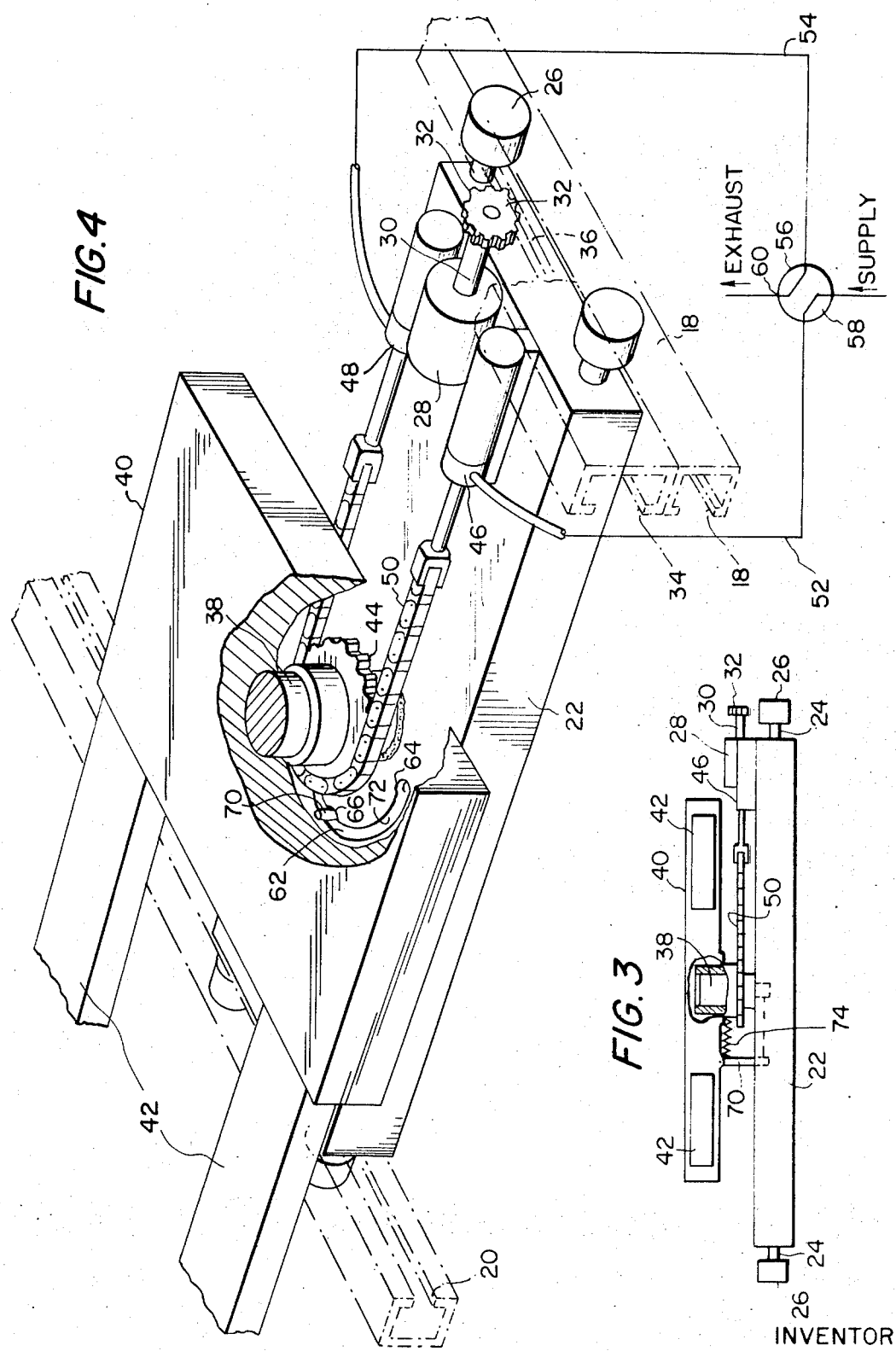

HORIZONTALLY TURNABLE MATERIAL HANDLING FORKS

BACKGROUND OF THE INVENTION

Stackers are widely used in warehousing systems to insert and remove loads in storage racks. Normally, an aisle extends between two parallel racks, and a stacker moves along the aisle for carrying loads to a desired storage position or for picking up loads from a storage position. The stacker usually has a mast which is vertically mounted on a roller support which moves along overhead rails in the configuration of well known stacker cranes or which is supported on the floor in the configuration of well known stacker trucks. A carriage moves vertically on the mast for positioning opposite a storage location in a rack. A carrier which is mounted on the carriage moves toward the rack, whereupon the carriage is slightly lowered or slightly raised depending upon whether the operation is a storage sequence or withdrawal sequence. Then the carrier is withdrawn from the rack.

Two types of storage racks are well known. In a first type, the rack consists mainly of vertical load members with short horizontal cleats for holding pallets. In a similar device, pallets may have cleats which fit into holes on vertical members of a storage rack. In both of those cases, the stacker carrier may be configured with a shuttle platform which moves into the rack beneath a pallet and between the supporting cleats.

In the other basic type of storage rack, horizontal shelf members or beams support the pallets. Shuttle platforms cannot be used with such racks, and it is conventional to use forks for inserting into the pallets.

While shuttle platforms may be constructed for movement either to the left or to the right of the carriage, it is not as easy to mount forks for operation on either side of the carriage. Since pallets are usually constructed with a central upright member, spaced forks must be supported at one end and must be cantilevered throughout their length for insertion into the pallet. A problem thus exists of how to support the forks at one end while being able to use the forks on either side of the aisle.

One attempt at a solution of the problem of being able to support the forks on either side of the aisle has been to use two pair of forks which are joined to each other at substantially a right angle. A pivot at the point where the forks are joined underlies a stop so that one pair of forks resting vertically against the stop supports the other pair of forks in a horizontal position for holding a load. The pair of forks which is vertically supported adds unnecessary weight to the apparatus. The forks cannot be switched from one side to another while the stacker truck is in a narrow aisle because the hypotenuse distance between tips of the forked pairs is usually wider than the aisle.

Another method of moving forks from one side to another is disclosed in copending application, Ser. No. 27,728, filed Apr. 13, 1970, by Alexander Weisker and Raymond L. Smith, Jr., and entitled Side Loading Stacker.

Other attempts have been made to pivot an entire mast assembly so that a stacker might serve either side of the aisle. The pivoting of a mast assembly requires very heavy rotating equipment which greatly reduces the payload of a system or which requires strengthened mast holding apparatus. Moreover, turning of a mast in an aisle requires a great deal of space which is inimical with the purpose of space-conserving narrow aisle warehousing systems.

SUMMARY OF THE INVENTION

The invention provides horizontally turnable material handling forks for increasing the efficiency of warehouse systems by reducing the aisle width required by stacker-retrievers.

The material handling apparatus has a carriage mounted for upward and downward movement on a base, for example a mast of a lift truck. Extensible means such as hydraulic lift actuators and chains connect the carriage with the base for moving the carriage. Wheeled platform carrier means is mounted on the carriage for horizontal movement in a direction transverse to forward movement of the truck base. Pin means extend vertically upward from the carrier platform. Forks are rotatably mounted on the carrier. Turning means such as a piston carried rack and a pinion are connected to the carrier means and to either the pin or forks for rotating the forks in a horizontal plane on the carrier. Driving means are connected to the carrier and to the carriage for moving the carrier across the carriage. Attachment means are provided for attaching the carriage to a mast and to a vertically movable means on the mast.

In a preferred embodiment, a stacker-retriever, such as a lift truck, has a vertically movable carriage having a generally horizontal platform. A carrier is mounted on the platform on the platform by roller means, disposed between two spaced inward-opening channel tracks for permitting transverse movement of the carrier relative to the direction of travel of the stacker-retriever. Pin means has a first section rigidly mounted on the carrier and a second section mounted on the first section for rotative movement relative to the carrier. Fork means, which include a pair of material handling forks and a mounting head, are mounted on the second section of the pin. The forks extend from the head for operatively engaging pallets or cleats during stacking or withdrawal operations.

In a preferred embodiment, the turning means has a pair of hydraulic actuators mounted on the carrier. Each actuator is connected to an end of a flexible member, such as a chain. An intermediate portion of the chain passes around a pivot and is connected to the head. When one actuator arm is retracted, the other cooperatively extends and the chain turns the head and the forks.

In another embodiment, a motor mounted on the carrier has a pinion which engages a semicircular rack in the head. Or, the pinion extends downward from the head to engage a rack in the carrier. The motor is fluidally or electrically operated.

In another embodiment of the fork turning device, a hydraulic motor has a gear attached to a rotatable shaft. The motor is mounted on the carrier and a sprocket is mounted on the head. An endless flexible member, such as a chain, passes around the gear and sprocket, providing means for transmitting angular motion of the motor-driven gear to the sprocket and the head. The motor may also be electrically operated.

Stop means are provided for stopping the angular motion of the head and forks at the preferred positions of extreme left, extreme right, and straight ahead. Other stopping positions are provided where useful. In one form of the detent means a head-mounted spring-loaded follower moves in a carrier recess, stopping in depressions. The stop means may be electrically or fluidally controlled.

In one embodiment, the turning and stopping devices have means for regulating the rates of acceleration and deceleration of the head during a turning operation to prevent flinging loads from the forks.

Sensors are provided to sense contact of the turning forks striking an obstruction. The sensing means include a device to override the operator's controls to prevent the load from being unintentionally dislodged from the forks or to prevent the turning forks from unintentionally dislodging a pallet from the storage racks.

The pin is rigidly attached to the carrier and extends vertically upward into a corresponding socket in the head. Alternatively, the pin is rigidly attached to the rotatable head and extends vertically downward into a cooperative socket in the carrier. Suitable bearings surround the pin to insure rolling contact between the head and the pin.

In one embodiment, the pin exerts an upward reactant force and counter-moment against the gravitational forces and moment caused by the head, forks and load.

In another embodiment, a series of load-carrying roller or ball bearings are positioned between the pin and the ends of the cantilevered forks to reduce the moments and forces on the pin. Bearings are restrained in a race attached to either the carrier or the head.

The carrier is mounted between two spaced inward opening channel tracks. Driving means mounted on the carrier engage a cooperative portion of the channel tracks for moving the carrier relative to the tracks. The driving means is a fluid motor having a gear; the cooperative portion of the channel is a flexible member, such as a chain, having its ends fixed to the channel.

One convenient form of the driving means for moving the carrier relative to the platform is described in copending application, Ser. No. 27,728, filed Apr. 13, 1970, by Alexander Weisker and Raymond L. Smith, Jr., entitled, "Side Loading Stacker."

One object of the invention is to provide horizontally-turnable material handling forks.

Another object of the invention is to provide means for turning material handling forks in a substantially horizontal plane.

The foregoing and other object and features of the invention will be apparent from the specification which includes the claims and from the drawings.

BRIEF DESCRIPTION OF THE DRAWINGS

FIG. 3 is a side elevation of the fork holding head and carrier.

FIG. 4 is a perspective view of the carrier with the head in the straight ahead position.

DETAILED DESCRIPTION OF THE DRAWINGS

Figure 1:
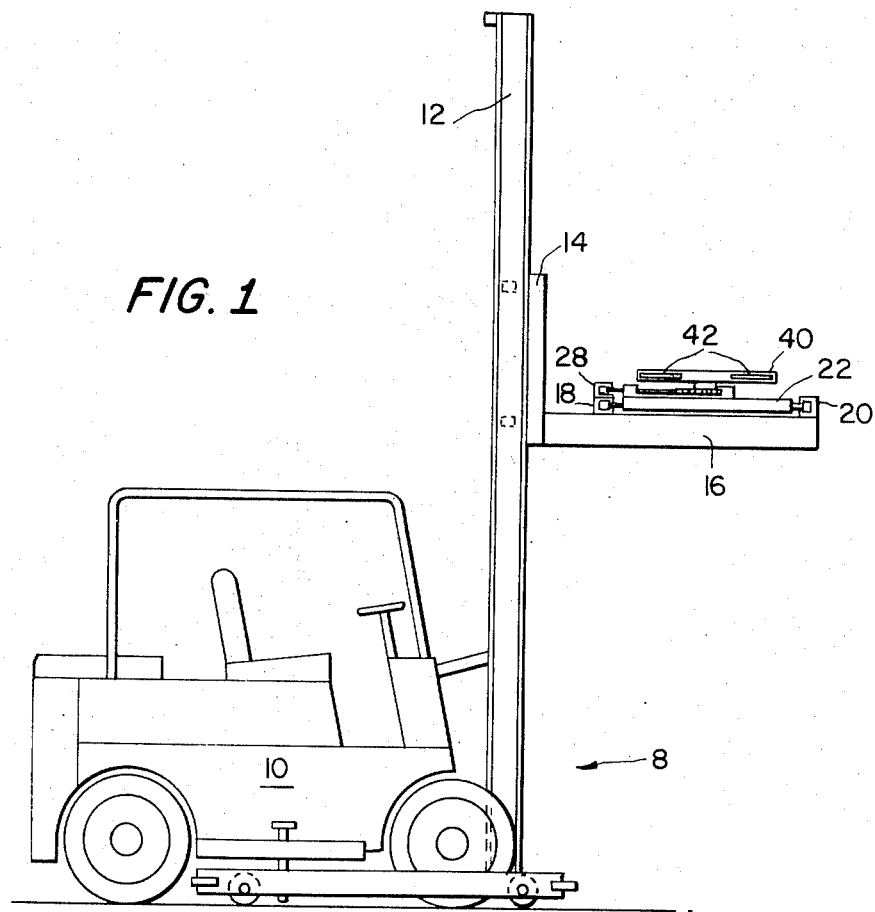
FIG. 1 is a side elevation of the horizontally turnable material handling forks shown mounted on a lift truck.

Referring to FIG. 1, a base 8 comprises stacker truck 10 and vertical mast 12. Carriage 14 is track-mounted in mast 12 for up and down motion.

Figure 2:
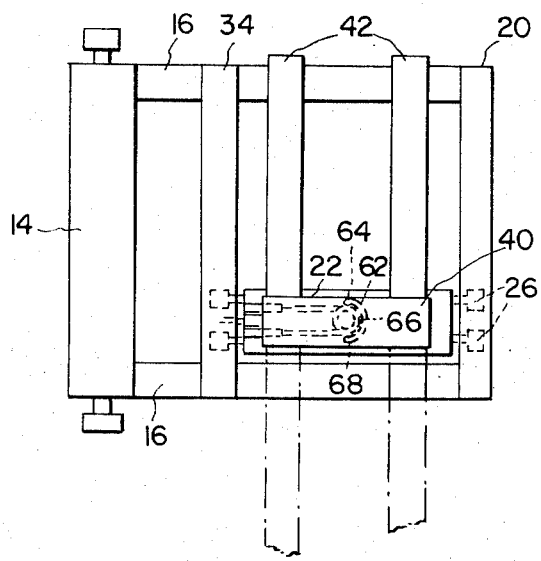
FIG. 2 is a plan view of the carriage and horizontally turnable material handling forks of FIG. 1.

As shown in FIGS. 1 and 2, carriage 14 has a horizontal forwardly extending platform 16. Two spaced inward-opening channel rails 18 and 20 are positioned on platform 16 perpendicular to the direction of travel. Carrier 22 is mounted between channel rails 18 and 20 and has axles 24 and wheels 26 extending into guided by the rails.

FIG. 3 shows the driving means for moving the carrier relative to the platform as a gear engaging chain as described in copending application, Ser. No. 27,728, filed Apr. 13, 1970, by Alexander Weisker and Raymond L. Smith, Jr. for a side loading stacker. Hydraulic motor 28 is mounted on the upper surface of carrier 22. An output shaft 30 extends from motor 28; gear 32 is attached to the distal end of shaft 30. Inward facing channel 34 is suitably attached to the top of channel rail 18. Chain 36 is housed within channel 34 and is connected to the channel. Shaft 30 extends into channel 34, and gear 32 operatively engages chain 36 for moving carrier 22 across platform 16 perpendicular to the direction of truck travel. Hydraulic motor 28 is reversible and is capable of rotating output shaft 30 and gear 32 in both clockwise and counter clockwise directions. Thus, hydraulic motor 28 provides driving means for moving carrier 22 to the right and left of platform 16.

Pin 38 is rigidly mounted on carrier 22 and extends vertically upward from the carrier.

Head 40 is rotatively mounted on pin 38 by suitable bearings. A pair of material handling forks 42 extend from head 40 for carrying a load.

As shown in FIGS. 3 and 4, the forks are turned by hydraulic actuators and a chain. Sprocket 44 is attached to the lower face of head 40. Hydraulic actuators 46 and 48 are mounted on carrier 22. Flexible chain 50 has its ends connected to actuators 46 and 48 and has an intermediate portion engaged with sprocket 44. Hydraulic pressurization lines 52 and 54 are connected between control valve 56 and actuators 46 and 48, respectively; other ends of lines 52 and 54 are connected to control valve 56. Valve 56 has inlet port 58 for supplying fluid under pressure to one actuator. Outlet port 60 of valve 56 simultaneously permits fluid from the other actuator to flow to exhaust.

A trough 62 is disposed in the upper surface of carrier 22. Three detent positions 64, 66 and 68 on inner surface 72 of trough 62 correspond to extreme left, straight ahead, and extreme right positions of forks 42. Key pin 70 is pivotally attached to head 40 and extends vertically downward from the lower surface of the head for insertion into trough 62. Key pin 70 is forced against the inner surface 72 of trough 62 by spring 74.

Operation

With the forks in the extreme left position and with the carrier displaced to the right, the lift truck is moved along a warehouse aisle to the desired pallet. The carriage is raised to a suitable height. When the forks have been aligned with the pallet, carrier 22 is moved to the left until the forks have passed under the pallet or through the pallet cleats. Carriage 14 is moved vertically upward to lift the pallet from the storage racks. Carrier 22 and the pallet are then withdrawn to the right.

If the withdrawn pallet is to be stacked in a left storage rack, the forks 42 remain in the extreme left position. Thus, the load-carrying forks are positioned over the platform for travel.

If the withdrawn pallet is to be stacked in a right storage rack, the load-carrying forks are rotated 180° in a clockwise direction. The forks may be rotated as carrier 22 is simultaneously moved. Or, carrier 22 may be moved and the forks may be subsequently rotated.

To rotate the forks in a clockwise direction, valve 56 is suitably aligned to permit fluid flow from a fluid source through valve 56 and line 54 into actuator 48; simultaneously, fluid is permitted to flow from actuator 46 through line 52 and valve 56 to exhaust. Thus, actuator 48 pulls chain 50 and rotates sprocket 44, head 40, and forks 42 in a clockwise direction. As the head rotates, inner surface 72 of trough 62 forces key pin 70 to extend spring 74 and to leave left detent position 64. As head 40 turns past the straight ahead position, key pin 70 follows inner surface 72 through detent position 66. Rotation of the head continues until spring 74 forces key pin 70 into right detent position 68. As before stated, the carrier movement device and the head turning device are independently controlled systems. Thus, carrier 22 may be transversely moved across platform 16 as head 40 and forks 42 rotate. With the forks in the extreme right position and with the carrier moved to the left, the load carrying forks are ready to insert the pallet into a right storage rack.

The material handling apparatus is similarly operated to withdraw a pallet from a right storage rack.

Use of independent systems for turning the head and for moving the carrier permits the stacker-retriever to operate in aisles only slightly larger than the width of the base.

While the invention has been particularly shown and described with reference to a preferred embodiment thereof, it will be understood by those skilled in the art that various changes in form and details may be made therein without departing from the spirit and scope of the invention.

What is claimed is:

1. Material handling apparatus comprising a carriage mounted on a base for upward and downward movement, carrier means mounted on the carriage for generally horizontal movement with respect thereto in a direction generally perpendicular to a forward direction of the base, pin means extending vertically from the carrier means, fork means mounted on the pin means, turning means connected to the carrier means and to one of the pin and fork means for turning the fork means in a generally horizontal plane with respect to the carrier means, stop means associated with the turning means for limiting movement of the fork means between two 180° opposite positions in a direction of movement of the carrier means, positioning means having a spring loaded means and three detents arranged in a semi-circular opening about the pin means for holding the fork means in positions perpendicular and parallel to a forward direction of the base, and driving means connected to the carrier means and to the carriage for moving the carrier means across the carriage.

2. The material handling apparatus of claim 1 wherein the carrier means comprises a generally rectangular member elongated in a forward direction of the base having roller means at opposite longitudinal ends thereof.

3. The materials handling apparatus of claim 2 wherein the carriage means comprises a generally horizontal platform having spaced inward opening channel tracks mounted thereon and parallely oriented in a direction transverse to a forward direction of the base for receiving the roller means of the carrier means.

4. The apparatus of claim 1 wherein the pin means comprises a first section rigidly mounted in the carrier means and extending toward the fork means and a second section rigidly mounted in the fork means and rotatable on the first section.

5. The materials handling apparatus of claim 1 wherein the base comprises an attachment means for attaching the carriage to a mast and to a vertically movable means on the mast.

6. The materials handling apparatus of claim 1 wherein the base comprises a stacker truck having a mast movably holding the carriage and extensible means connected to the carriage for driving the carriage vertically along the mast.

7. The materials handling apparatus of claim 1 wherein the carriage has a general horizontal platform, spaced inward opening channel rails mounted on the platform and parallely oriented transverse to a forward direction of the base, wherein the carrier means is generally elongated in the forward direction of the base and has roller means in extension of opposite longitudinal ends of the carrier means, wherein the pin means comprises a first section rigidly mounted in the carrier means and extending upward therefrom and wherein the fork means comprises support means having a second section of the pin means mounted therein and parallel forks extending horizontally outward from the support.

* * * * *